US008289307B2

(12) United States Patent
Chiang et al.

(10) Patent No.: US 8,289,307 B2
(45) Date of Patent: Oct. 16, 2012

(54) SOURCE DRIVER WITH LOW POWER CONSUMPTION AND DRIVING METHOD THEREOF

(75) Inventors: Cheng-Lung Chiang, Tainan County (TW); Way-Guo Tseng, Tainan County (TW); Jui-Lin Chang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 897 days.

(21) Appl. No.: 12/394,526

(22) Filed: Feb. 27, 2009

(65) Prior Publication Data

US 2010/0220084 A1 Sep. 2, 2010

(51) Int. Cl.
*G06F 3/038* (2006.01)

(52) U.S. Cl. ........................................ 345/211; 345/204

(58) Field of Classification Search ........................ None
See application file for complete search history.

(56) References Cited

U.S. PATENT DOCUMENTS

| | | | | |
|---|---|---|---|---|
| 7,078,864 | B2 * | 7/2006 | Kudo et al. | 315/169.1 |
| 7,916,134 | B2 * | 3/2011 | Morita | 345/212 |
| 2006/0244531 | A1 | 11/2006 | Sung | |
| 2008/0068316 | A1 * | 3/2008 | Maekawa | 345/87 |
| 2008/0143697 | A1 * | 6/2008 | Kojima | 345/204 |

* cited by examiner

*Primary Examiner* — Jason Olson
(74) *Attorney, Agent, or Firm* — J.C. Patents

(57) ABSTRACT

A source driver with low consumption and the driving method thereof are provided herein. The source driver includes an output buffer with a first input terminal receiving a pixel signal, a second input terminal, and an output terminal coupled to the second input terminal and a display panel. The source driver also includes a pre-charge circuit pre-charges a first terminal of the display panel to a first preset voltage or a second preset voltage for a pre-charge period according to a polarity of a common voltage coupled to the display panel. The second preset voltage is smaller than the first preset voltage. The output buffer is inactivated during the pre-charge period and activated for a preset period after the pre-charge period. Therefore, the present invention reduces power consumption of the source driver.

15 Claims, 4 Drawing Sheets

SOURCE DRIVER WITH LOW POWER CONSUMPTION AND DRIVING METHOD THEREOF

BACKGROUND OF THE INVENTION

1. Field of the Invention

The present invention relates to a source driver and a driving method thereof, and more particularly, to a source driver that includes an output buffer charging the display panel in a phased manner for reducing power consumption.

2. Description of Related Art

FIG. 1 is a block diagram of a conventional source driver 110 and a display panel 140. Referring to FIG. 1, the source driver 110 includes a plurality of driving channels 120. Each of the driving channels 120 includes a latch 122, a digital-to-analog converter (DAC) 124, an output buffer 126, and an output switch 128. Video data on the data bus is sequentially input into the driving channels 120 in response to a control signal CON provided by a timing controller (not shown). The source driver 110 converts the digital video data into analog driving signal through the DAC 124, and transmits the driving signal to the output buffer 126. The output buffer 126 further enhances the driving signal and passes the driving signals to the display panel 140 through the conducted output switch 128 for driving pixels on the display panel 140.

Generally, in the driving system of the LCD, a polarity of the driving signal delivered to a certain pixel must be periodically converted for avoiding a residual image phenomenon caused by liquid crystal polarization. There are three types of polarity inversion for driving the display panel, i.e. frame inversion, column inversion, and dot inversion. Taking the dot inversion as an example, the adjacent pixels in one frame are driven by the driving signals with opposite polarities, and the pixels in the same location of two continuous frames are also driven by the driving voltages with opposite polarities. Since the driving signal with opposite polarities have different voltage levels, the voltage swing of the output buffer 126 causes large power consumption so the output buffer 126 contributes a large percentage of power consumption to the source driver 120. Therefore, how to solve this problem becomes an important issue to be researched and discussed.

SUMMARY OF THE INVENTION

Accordingly, the present invention provides a source driver and a driving method thereof can reduce power consumption.

A source driver adapted to drive a display panel is provided in the present invention. The source driver includes an output buffer and a first pre-charge circuit. The output buffer has a first input terminal receiving a pixel signal, a second input terminal, and an output terminal coupled to both of the second input terminal thereof and the display panel. The first pre-charge circuit pre-charges a first terminal of the display panel to a first preset voltage or a second preset voltage for a pre-charge period according to a polarity of a common voltage coupled to the display panel, wherein the second preset voltage is smaller than the first preset voltage, and the output buffer is inactivated during the pre-charge period and activated for a preset period after the pre-charge period.

In an embodiment of the present invention, the foregoing source driver further includes an operational amplifier. The operational amplifier provides the pixel signal to the first input terminal of the output buffer, wherein the output buffer is inactivated for a transmission period after the preset period, and the pixel signal provided from the operational amplifier is delivered to the output terminal of the output buffer during the transmission period.

In an embodiment of the present invention, the foregoing source driver further includes a common voltage generating circuit and a second pre-charge circuit. The common voltage generating circuit generates the common voltage to a second terminal of the display panel after the preset period. The second pre-charge circuit pre-charges the second terminal of the display panel to the first preset voltage or to the second preset voltage during the pre-charge period according to the polarity of the common voltage.

A driving method adapted to a source driver to drive a display panel is provided in the present invention. The source driver includes an output buffer having a first input terminal receiving a pixel signal, a second input terminal, and an output terminal coupled to the second input terminal and a display panel. In the driving method, a first terminal of the display panel is pre-charged to a first preset voltage or to a second preset voltage for a pre-charge period according to a polarity of a common voltage coupled to the display panel, wherein the second preset voltage is smaller than the first preset voltage, and the output buffer is inactivated during the pre-charge period. Next, the output buffer is activated for a preset period after the pre-charge period.

In an embodiment of the foregoing driving method, the output buffer is inactivated for a transmission period after the preset period. Besides, the pixel signal is delivered to the output terminal of the output buffer during the transmission period.

In an embodiment of the foregoing driving method, a second terminal of the display panel is pre-charged to the first preset voltage or to the second preset voltage during the pre-charge period according to the polarity of the common voltage. Next, a common voltage is provided to the second terminal of the display panel for the preset period.

The present invention utilizes the first pre-charge circuit assisting the output buffer in charging the first terminal of the display panel to the voltage level of the pixel signal in a phased manner. During the pre-charge period and/or the transmission period, the output buffer is inactivated so as to reduce an amount of activated time of the output buffer and reduce power consumption of the source driver as a consequence. Besides, the second pre-charge circuit is utilized to charge the second terminal of the display panel to the common voltage in a phased manner so as to reduce power consumption of the source driver as well.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
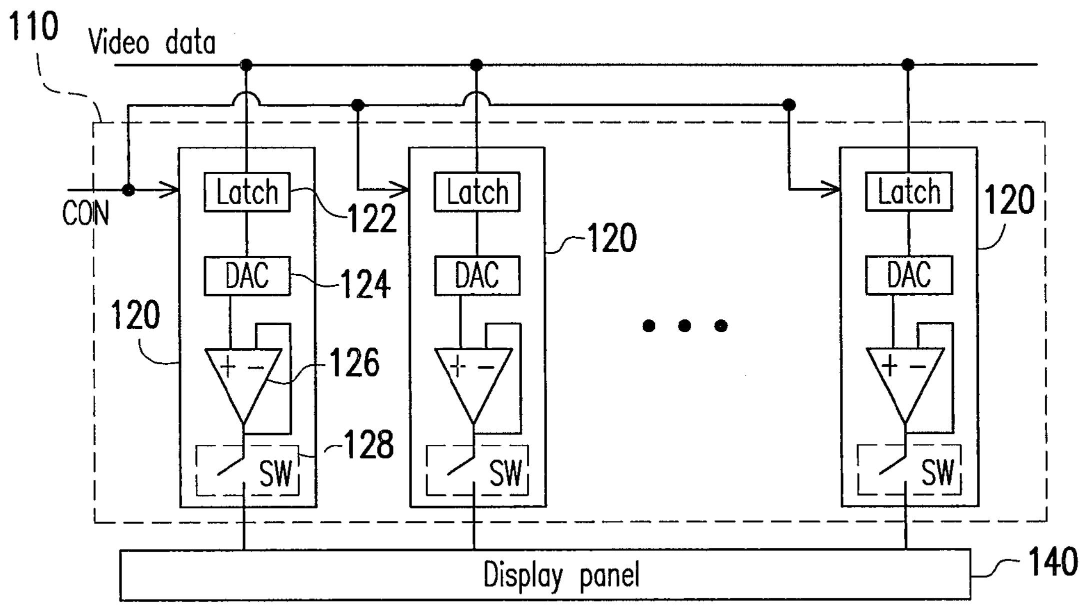
FIG. 1 (PRIOR ART)
FIG. 1 is a block diagram of a conventional source driver and a display panel.

Reference will now be made in detail to the present embodiments of the invention, examples of which are illustrated in the accompanying drawings. Wherever possible, the same reference numbers are used in the drawings and the description to refer to the same or like parts.

Figure 2A:
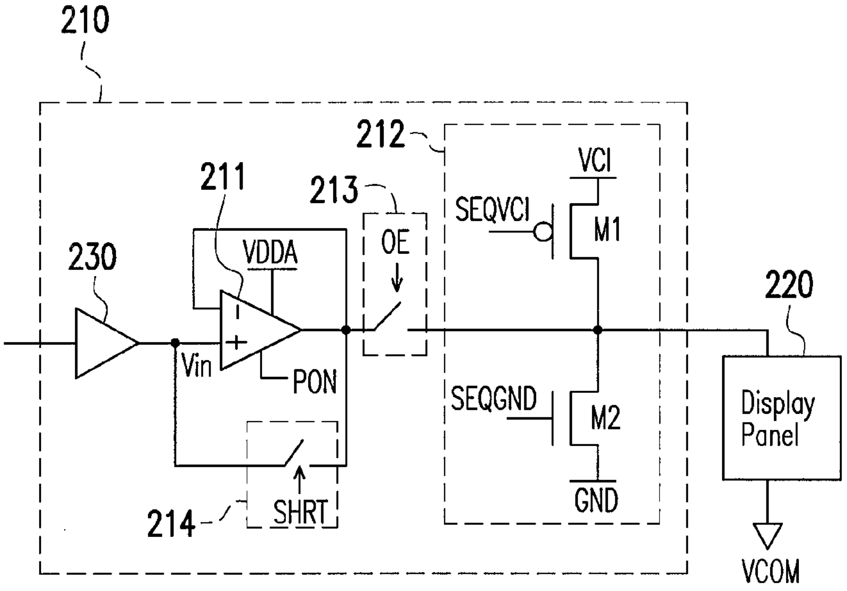
FIG. 2A is a circuit diagram of a source driver according to an embodiment of the present invention.

FIG. 2A is a circuit diagram of a source driver according to an embodiment of the present invention. Referring to FIG. 2A, the source driver 210 is adapted to drive a display panel 220, for example, a liquid display panel or a liquid crystal on silicon (LCoS) panel. Generally, the display panel 220 includes a plurality of pixel circuits (not shown) disposed on, and liquid crystal corresponding to location of each pixel circuit is oriented according to a voltage offset between a pixel electrode and a common electrode for controlling light transmission of liquid crystal, wherein a voltage of the pixel electrode is changed as a pixel signal and a voltage of the common electrode (called as a common voltage VCOM) may be a direct-current (DC) voltage or an alternating-current (AC) voltage. For the convenience of description, a first terminal and a second terminal of the display panel 220 can be seen as the pixel electrode and the common electrode, respectively.

The source driver 210 includes an output buffer 211, a pre-charge circuit 212, and switching units 213-214, wherein the switching units 213-214 can be respectively implemented by switches, transistors or other semiconductor elements, and the conductive states of the switching units 213-214 are respectively determined by two control signals OE and SHRT. In addition, people ordinarily skilled in the art know that the source driver further includes other elements not shown in FIG. 2A, e.g. shift register, digital-to-analog converter, and etc., so the details related to those elements is not described herein. The output buffer 211, for example, is implemented by an operational amplifier (OPAMP), which has a first input terminal (i.e. non-inverted terminal) receiving the pixel signal Vin provided by an operational amplifier 230, and has both of a second input terminal (i.e. inverted terminal) and an output terminal coupled together, wherein the operational amplifier 230 is shown to represent a source providing the pixel signal Vin. The operational amplifier 230 is shown to represent an anterior stage of the output buffer 211 to provide the pixel signal Vin. The output buffer 211 enhances a driving ability of the pixel signal Vin to avoid signal attenuation during transmission, and delivers the enhanced pixel signal to the first terminal of the display panel 220 when the switching unit 213 is conducted for driving pixels on the display panel 220. The output buffer 211 is determined to be activated or inactivated according to a control signal PON, such as a power supply signal. The switching unit 214 coupled between the first input terminal and the output terminal of the output buffer 211 can directly deliver the pixel signal provided by the operational amplifier 230 to the output terminal of the output buffer 211 when the switching unit 214 is conducted.

As known, polarity inversion is usually performed to drive the pixels on the display panel 220. Since the pixel signal with positive polarity and the pixel signal with negative polarity have different voltage levels, the output buffer 211 operates at high voltage swing and then results in power consumption. When the output buffer 211 is activated, the output buffer 211 operates as a voltage follower in which a voltage at the output terminal of output buffer 211 follows a voltage of the pixel signal received by the first input terminal of the output buffer 211 until both of them are substantially equal.

In the embodiment of the present invention, before the output buffer 211 is activated to enhance the pixel signal Vin and deliver the enhanced pixel signal via the switching unit 213, a pre-charge circuit 212 is utilized to pre-charge the first terminal of the display panel 120 to a first preset voltage (e.g. a DC voltage VCI) or a second preset voltage (e.g. a ground voltage GND) according to the polarity of the common voltage coupled to the display panel 220. The first preset voltage VCI is smaller than a positive power voltage VDDA of the output buffer 211. As a result, an amount of activated time of the output buffer 211 can be reduced, so does the power consumption of the source driver 210. The pre-charge circuit 212 includes a switch M1 and a switch M2 respectively implemented by a P-type transistor and an N-type transistor. The switch M1 is conducted to deliver the first preset voltage VCI to the first terminal of the display panel 220 in response to a control signal SEQVCI, and the switch M2 is conducted to deliver the second preset voltage GND to the first terminal of the display panel 220 in response to a control signal SEQGND. One of the switches M1 and M2 is conducted according to the polarity of the common voltage VCOM. The following describes the operation of the source driver 210 in detail.

It is assumed that the AC common voltage VCOM is utilized in the embodiment of the present invention to perform polarity inversion. When the pixel on the display panel 220 is driven by positive polarity, the pixel signal and the common voltage with positive polarity (e.g. +3.2 volts) should be provided to the first terminal and the second terminal of the display panel 220, respectively. On the contrary, when the pixel on the display panel 220 is driven by negative polarity, the pixel signal and the common voltage VCOM with negative polarity (e.g. −1.2 volts) should be provided to the first terminal and the second terminal of the display panel 220, respectively. In the following embodiments, the pixel signal is assumed to be positive, e.g. in the range between 2 volts and 4.6 volts. By alternatively providing the common voltages with different polarities at different time, a voltage offset between the first terminal and the second terminal of the display panel 220 can drive the liquid crystal at different polarity directions. The voltage of the pixel signal and the common voltage VCOM should be designed as requirement.

Figure 2B:
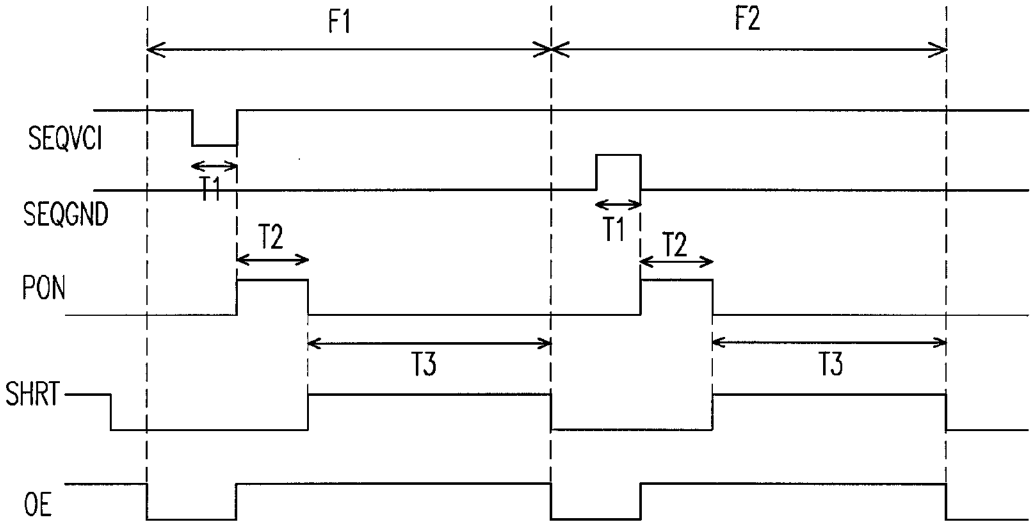
FIG. 2B is a timing diagram of the source driver according to the embodiment in FIG. 2A.

FIG. 2B is a timing diagram of the source driver 210 according to the embodiment in FIG. 2A. Referring to FIG. 2A and FIG. 2B, during a frame period F1, the source driver 210 drives the display panel 210 with positive polarity, and the common voltage VCOM with positive polarity (e.g. +3.2 volts) is provided to the second terminal of the display panel 220. When the common voltage VCOM has positive polarity, the pre-charge circuit 212 pre-charges the first terminal of the display panel 220 to a first preset voltage VCI (e.g. +2.8 volts) via the conducted switch M1 for a pre-charge period T1 before the control signal PON is asserted to activate the output buffer 211. During the pre-charge period T1, the output buffer 211 is inactivated for reducing power consumption.

After the pre-charge period T1, the control signal PON is asserted to activate the output buffer 211 for a preset period T2 so that the output buffer 211 can enhance the pixel signal Vin (e.g. +3.5 volts) during the preset period T2. Simultaneously, the switching unit 213 is conducted by the asserted control signal OE to deliver the enhanced pixel signal to the first terminal of the display panel 220. Since the voltage at the output terminal of the output buffer 211 follows the voltage of the pixel signal Vin, the output buffer 211 activated by the control signal PON charges the first terminal of the display panel 220 to the voltage of the pixel signal Vin. At present, a voltage swing of the output buffer 211 is between the first preset voltage VCI and the voltage of the pixel signal Vin, so that the power consumption of the output buffer 211 can be reduced during the preset period T2.

After the preset period T2 sufficient to charge the first terminal of the display panel 220 to the voltage of the pixel signal Vin, the control signal PON is de-asserted to inactivate the output buffer 211 again for a transmission period T3 in order to save power consumption. In the meanwhile, the switching unit 214 is conducted during the transmission period T3 to directly deliver the pixel signal Vin provided by the operational amplifier 230 to the output terminal of the output buffer 211 and to the first terminal of the display panel 220 via the switching unit 213 conducted by the control signal OE.

Referring to FIG. 2A and FIG. 2B, during a frame period F2, the source driver 210 drives the display panel 220 with negative polarity, and the common voltage VCOM with negative polarity (e.g. −1.2 volts) is provided to the second terminal of the display panel 220. When the common voltage VCOM has negative polarity, the pre-charge circuit 212 pre-charges the first terminal of the display panel 220 to the second preset voltage GND (e.g. 0 volt) via the conducted switch M2 for the pre-charge period T1 before the control signal PON is asserted to activate the output buffer 211. During the pre-charge period T1, the output buffer 211 is inactivated for reducing power consumption, and the first terminal of the display panel 220 is discharged from the pixel signal (e.g. +3.5 volts) to the second preset voltage GND (e.g. 0 volt).

After the pre-charge period T1, the control signal PON is asserted to activate the output buffer 211 is activated by the asserted control signal for the preset period T2 to enhance the pixel signal Vin (e.g. +2 volts). Simultaneously, the switching unit 213 is conducted by the asserted control signal OE to deliver the enhanced pixel signal to the first terminal of the display panel 220. Since the voltage at the output terminal of the output buffer 211 follows the voltage of the pixel signal Vin, the output buffer 211 activated by the control signal PON charges the first terminal of the display panel 220 to the voltage of the pixel signal Vin. At present, a voltage swing of the output buffer 211 is between the second preset voltage GND (e.g. 0 volt) and the voltage of the pixel signal Vin (e.g. +2 volts), so that the power consumption of the output buffer 211 can be reduced during the preset period T2.

After the preset period T2, the output buffer 211 is inactivated by the de-asserted control signal PON for the transmission period T3 in order to save power consumption. In the meanwhile, the switching unit 214 is conducted during the transmission period T3 to directly deliver the pixel signal Vin provided by the operational amplifier 230 to the output terminal of the output buffer 211 and to the first terminal of the display panel 220 via the switching unit 213 conducted by the control signal OE.

Figure 3A:
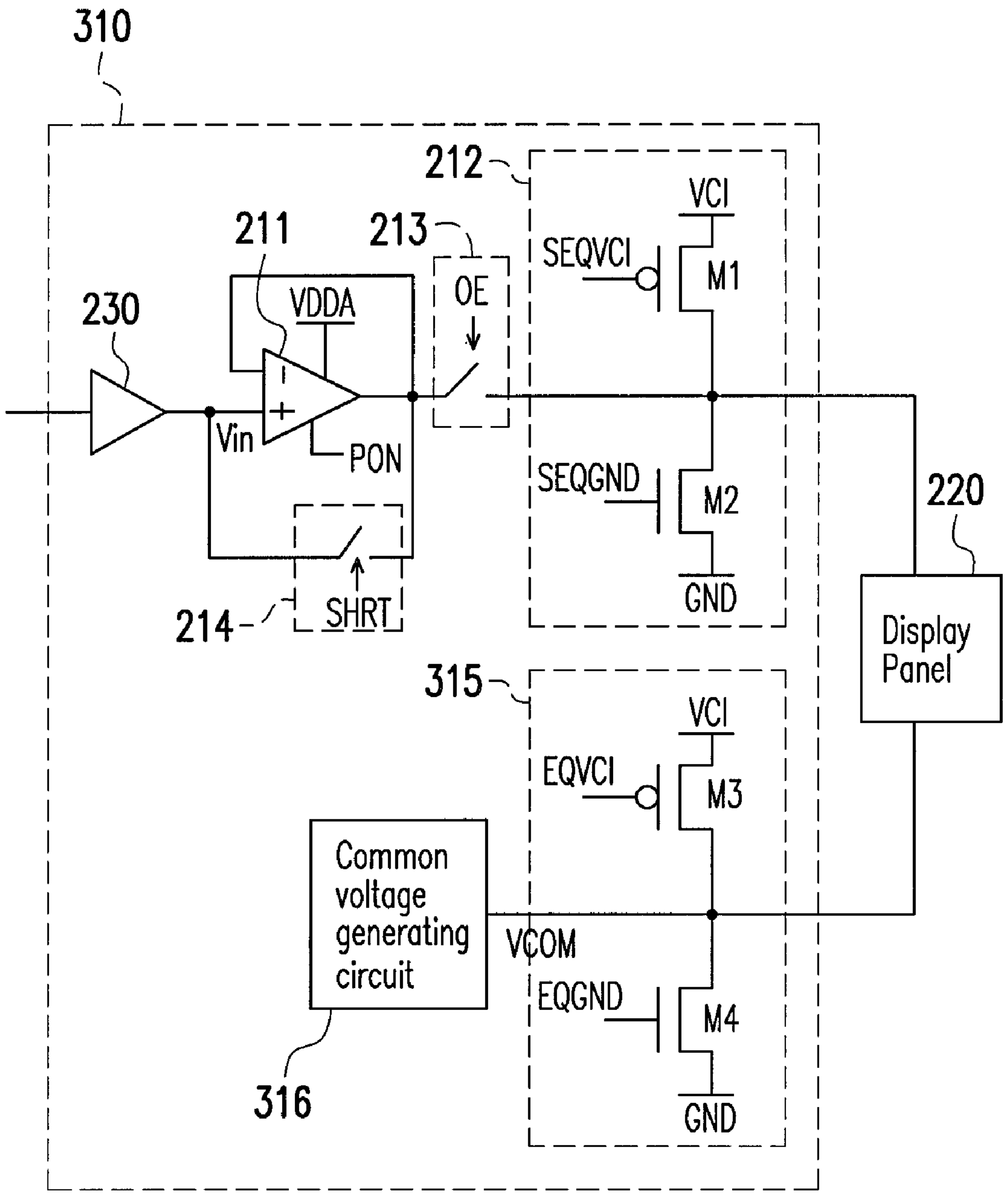
FIG. 3A is a circuit diagram of a source driver according to an embodiment of the present invention.

In order to make people ordinarily skilled in the art easily practice the present invention, there is another embodiment of the present invention that utilizes a pre-charge circuit to pre-charge the second terminal of the display panel 220 to the common voltage VCOM in a phased manner. FIG. 3A is a circuit diagram of a source driver 310 according to an embodiment of the present invention. Referring to FIG. 2A and FIG. 3A, the difference between the embodiments in FIG. 2A and FIG. 3A is that the source driver 310 further includes a pre-charge circuit 315 and a common voltage generating circuit 316. The common voltage generating circuit 316 generates a common voltage VCOM to the second terminal of the display panel 220. The pre-charge circuit 315 pre-charges the second terminal of the display panel 220 to the first preset voltage VCI or to the second preset voltage GND according to the polarity of the common voltage VCOM. The pre-charge circuit 315 includes switches M3 and M4 respectively implemented by a P-type transistor and an N-type transistor. The switch M3 is conducted to deliver the first preset voltage VCI to the second terminal of the display panel 220 in response to a control signal EQVCI, and the switch M4 is conducted to deliver the second preset voltage GND to the second terminal of the display panel 220 in response to a control signal EQGND. One of the switches M3 and M4 is conducted according to the polarity of the common voltage VCOM. The output buffer 211, the switching units 213-214, and the pre-charge circuit 212 of the source driver 310 are the same as the above-described embodiment and may be referring to FIG. 2A, so relevant detailed descriptions will not be given here.

Figure 3B:
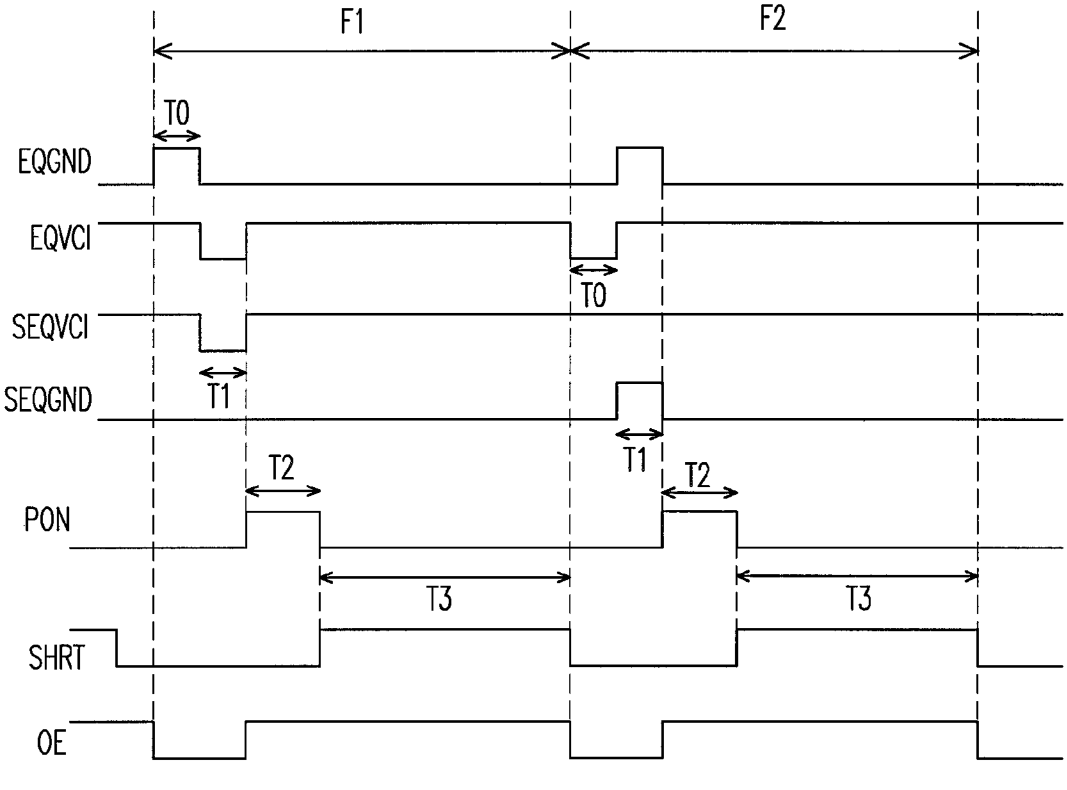
FIG. 3B is a timing diagram of the source driver according to the embodiment in FIG. 3A.

FIG. 3B is a timing diagram of the source driver according to the embodiment in FIG. 3A. Referring to FIG. 3A and FIG. 3B, during the frame period F1, the source driver 310 drives the display panel 220 with positive polarity and the common voltage VCOM with positive polarity (e.g. +3.2 volts) should be provided to the second terminal of the display panel 220 by the common voltage generating circuit 316. In the embodiment of the present invention, when the common voltage VCOM has positive polarity, the pre-charge circuit 315 pre-charges the second terminal of the display 220, originally having the common voltage with negative polarity (e.g. −1.2 volts) in the previous frame period, to the second preset voltage GND (e.g. 0 volt) via the conducted switch M4 during a period T0 which is before the pre-charge period T1. Then, the pre-charge circuit 315 pre-charges the second terminal of the display 220 to the first preset voltage VCI (e.g. +2.8 volts) for the pre-charge period T1. After the pre-charge period T1, the common voltage generating circuit 316 generates the common voltage with positive polarity to the second terminal of the display panel 220. Therefore, after the pre-charge period T1, a voltage offset between the first terminal and the second terminal of the display panel 220 can orient liquid crystal.

Referring to FIG. 3A and FIG. 3B, during the frame period F2, the source driver 310 drives the display panel 220 with negative polarity, and the common voltage VCOM with negative polarity (e.g. −1.2 volts) should be provided to the second terminal of the display panel 220 by the common voltage generating circuit 316. In the embodiment of the present invention, when the common voltage VCOM has negative polarity, the pre-charge circuit 315 pre-charges the second terminal of the display 220, originally having the common voltage with positive polarity (e.g. +3.2 volts) in the previous frame period F1, to the first preset voltage VCI (e.g. +2.8 volts) via the conducted switch M3 during the period T0 which is before the pre-charge period T1. Then, the pre-charge circuit 315 pre-charges the second terminal of the display 220 to the second preset voltage GND (e.g. 0 volt) for the pre-charge period T1. After the pre-charge period T1, the common voltage generating circuit 316 generates the common voltage with negative polarity (e.g. −1.2 volts) to the second terminal of the display panel 220.

Although the said embodiments give examples of setting the common voltage VCOM, the voltage of the pixel signal Vin, the first preset voltage and the second preset voltage, people ordinarily skilled in the art can should realize that the common voltage VCOM, and the voltage of the pixel signal Vin for driving the liquid crystal to display a certain gray scale of the image, and the said preset voltage can be set as requirement, so that the present invention is not limited thereto.

In summary, the embodiments of the present invention provide the source driver 310 that pre-charges the first terminal and the second terminal of the display panel 220 in a phased manner. The present invention utilizes the pre-charge circuits 212 and 315 assisting the output buffer 211 in charging the first terminal and the second terminal of the display panel to the voltage level of the pixel signal in the phased manner. During the pre-charge period and/or the transmission period, the output buffer 211 is inactivated so as to reduce an amount of activated time of the output buffer 211 and reduce power consumption of the source driver 310 as a consequence. Therefore, the embodiments of the present invention reduce power consumption of the source driver 210 without increasing layout area and cost. In addition, the embodiments of the present invention have more competitiveness in the market because of low power consumption.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A source driver, adapted to drive a display panel, comprising:

an output buffer, having a first input terminal receiving a pixel signal, a second input terminal, and an output terminal coupled to the second input terminal and the display panel;

a first pre-charge circuit, pre-charging a first terminal of the display panel to a first preset voltage or a second preset voltage for a pre-charge period according to a polarity of a common voltage coupled to the display panel, wherein the second preset voltage is smaller than the first preset voltage, the output buffer is inactivated during the pre-charge period, and is activated for a preset period after the pre-charge period;

a common voltage generating circuit, generating the common voltage to a second terminal of the display panel after the preset period; and a second pre-charge circuit, pre-charging the second terminal of the display panel to the first preset voltage or to the second preset voltage during the pre-charge period according to the polarity of the common voltage.

2. The source driver as claimed in the claim 1, further comprising:

a first switching unit, conducting the output terminal of the output buffer to the first terminal of the display panel for delivering a signal of the output terminal of the output buffer to the first terminal of the display panel.

3. The source driver as claimed in claim 1, further comprising:

an operational amplifier, outputting the pixel signal to the first input terminal of the output buffer, wherein the output buffer is inactivated for a transmission period after the preset period, and the pixel signal outputted from the operational amplifier is delivered to the output terminal of the output buffer during the transmission period.

4. The source driver as claimed in the claim 1, further comprising:

a second switching unit, conducting the first input terminal of the output buffer to the output terminal of the output buffer during the transmission period.

5. The source driver as claimed in the claim 1, wherein the first pre-charge circuit comprises:

a first switch, having a first terminal coupled to the first preset voltage, and a second terminal coupled to the first input terminal of the display panel, wherein the first switch is conducted for delivering the first preset voltage to the first terminal of the display panel; and a second switch, having a first terminal coupled to the first terminal of the display panel, and a second terminal coupled to the second preset voltage, wherein the second switch is conducted for delivering the second preset voltage to the first terminal of the display panel.

6. The source driver as claimed in the claim 5, wherein the first switch is conducted during the pre-charge period when the common voltage has a positive polarity, and the second switch is conducted during the pre-charge period when the common voltage has a negative polarity.

7. The source driver as claimed in claim 5, wherein the first preset voltage is a direct-current voltage smaller than a positive power voltage of the output buffer.

8. The source driver as claimed in the claim 1, wherein the second pre-charge circuit comprises:

a third switch, having a first terminal coupled to the first preset voltage, and a second terminal coupled to the second input terminal of the display panel, wherein the third switch is conducted for delivering the first preset voltage to the second terminal of the display panel; and a fourth switch, having a first terminal coupled to the second terminal of the display panel, and a second terminal coupled to the second preset voltage, wherein the fourth switch is conducted for delivering the second preset voltage to the second terminal of the display panel.

9. The source driver as claimed in the claim 8, wherein the third switch is conducted during the pre-charge period when the common voltage has a positive polarity, and the fourth switch is conducted during the pre-charge period when the common voltage has a negative polarity.

10. The source driver as claimed in the claim 9, wherein the fourth switch is conducted before the pre-charge period when the common voltage has the positive polarity, and the third switch is conducted before the pre-charge period when the common voltage has the negative polarity.

11. A driving method, adapted for driving a display panel by a source driver, wherein the source driver comprises an output buffer having a first input terminal receiving a pixel signal, a second input terminal, and an output terminal coupled to the second input terminal and a display panel, comprising:

pre-charging a first terminal of the display panel to a first preset voltage or to a second preset voltage for a pre-charge period according to a polarity of a common voltage coupled to the display panel, wherein the second preset voltage is smaller than the first preset voltage, and the output buffer is inactivated during the pre-charge period;

pre-charging a second terminal of the display panel to the first preset voltage or to the second preset voltage during the pre-charge period according to the polarity of the common voltage;

activating the output buffer for a preset period after the pre-charge period; and providing the common voltage to the second terminal of the display panel for the preset period.

12. The driving method as claimed in claim 11, wherein the step of pre-charging the first terminal of the display panel to the first preset voltage or to the second preset voltage for the pre-charge period according to the polarity of the common voltage comprises:

pre-charging the first terminal of the display panel to the first preset voltage during the pre-charge period when the common voltage has a positive polarity; and pre-charging the first terminal of the display panel to the second preset voltage during the pre-charge period when the common voltage has a negative polarity.

13. The driving method as claimed in claim 11, further comprising:

inactivating the output buffer for a transmission period after the preset period; and delivering the pixel signal to the output terminal of the output buffer during the transmission period.

14. The driving method as claimed in claim 11, wherein the step of pre-charging the second terminal of the display panel to the first preset voltage or to the second preset voltage during the pre-charge period according to the polarity of the common voltage comprises:

pre-charging the second terminal of the display panel to the first preset voltage during the pre-charge period when the common voltage has a positive polarity; and pre-charging the second terminal of the display panel to the second preset voltage during the pre-charge period when the common voltage has a negative polarity.

15. The driving method as claimed in claim 14, wherein the step of pre-charging the second terminal of the display panel to the first preset voltage or to the second preset voltage during the pre-charge period according to the polarity of the common voltage further comprises:

pre-charging the second terminal of the display panel to the second preset voltage before the pre-charge period when the common voltage has the positive polarity; and pre-charging the second terminal of the display panel to the first preset voltage before the pre-charge period when the common voltage has the negative polarity.

* * * * *